Patented July 14, 1953

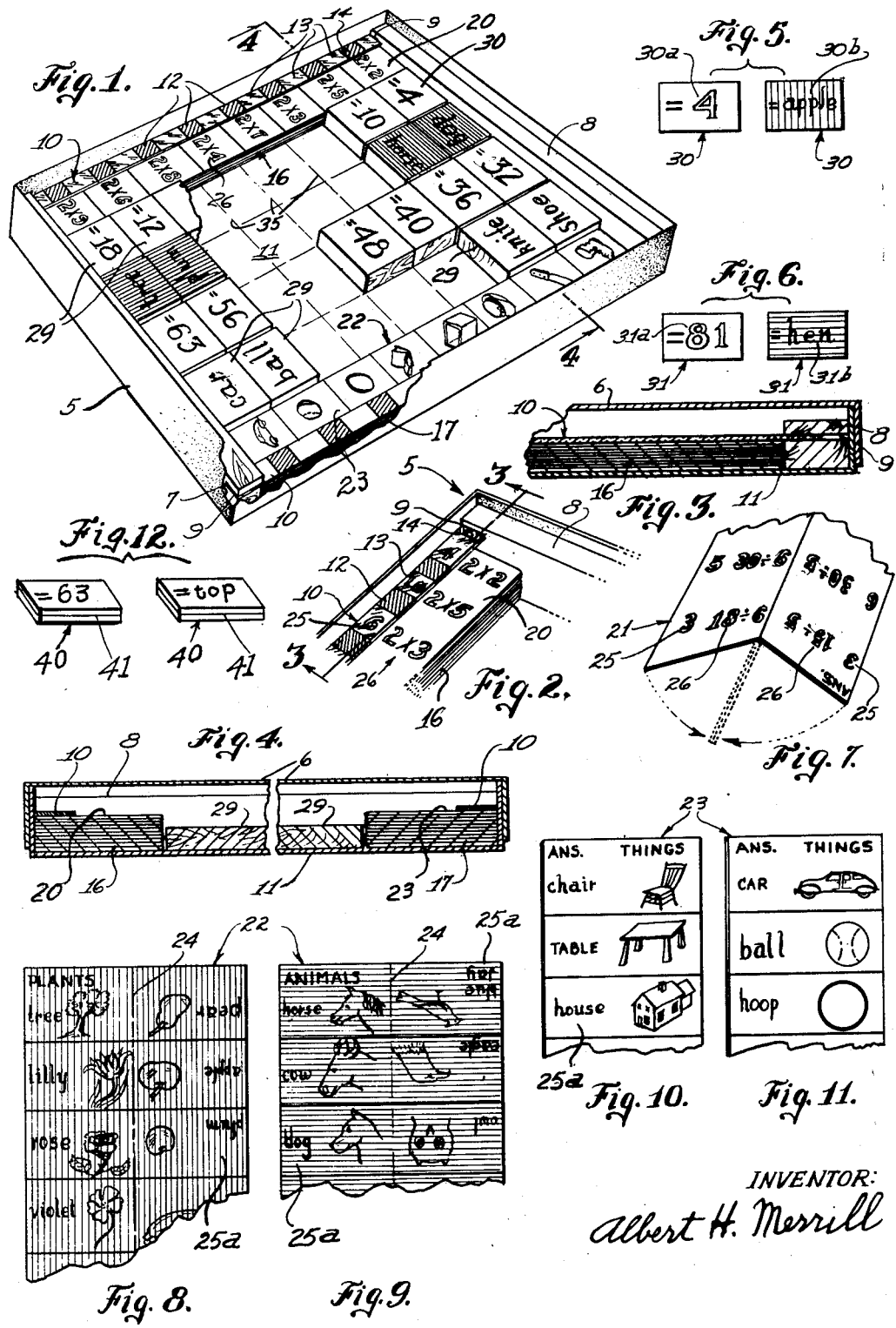
July 14, 1953
A. H. MERRILL
2,645,038
EDUCATIONAL DEVICE PRESENTING PICTORIAL AND NUMERICAL PROBLEMS
Filed Nov. 26, 1951
INVENTOR:
Albert H. Merrill

2,645,038

UNITED STATES PATENT OFFICE 2,645,038

EDUCATIONAL DEVICE PRESENTING PICTORIAL AND NUMERICAL PROBLEMS

Albert H. Merrill, Los Angeles, Calif.

Application November 26, 1951, Serial No. 258,122

5 Claims. (Cl. 35—31)

This invention relates to an educational device for teaching children the solutions of simple arithmetical problems, and also to aid them in learning to read the names of objects pictorially represented.

As a result of having tested the manufacturing cost and salability of an educational device of the above stated character, I have reached the conclusion that there remains room for improvement thereon in regard to simplifying structure, thus lowering cost of manufacture; and in regard to rendering the device of a more comprehensive character, so that a larger number of arithmetical and reading problems may be presented thereby.

Accordingly, it is an object of the present invention to provide a device wherein a larger number of problem carrying strips may be used; and also to provide a device of a duplex type wherein opposite internal portions of a tray may have problem slips mounted in them in pack formation, the problem slips of each pack being adjustable so as to bring uppermost the selected slip, so that problems carried by the upper face of such slip will be exposed to view for solution.

Another object is to provide for slidably mounting in a more satisfactory manner, in a partly overlying relation to a problem slip, an elongated member having along its length a series of alternating opaque and transparent portions; said member being adjustable between two positions, in one of which it conceals answers to problems on an underlying slip, prior to the solution of such problems; and in the other position discloses through its transparent portions the answers to the problems, as a check up on supposedly correct answers to them indicated by answer blocks which have been put in place alongside the various problem indications on the aforesaid strip.

The simplified educational device hereinafter described and claimed, is the result, along with an investigation of the prior art, of a great deal of inventive effort and experimentation, accompanied by repeatedly discarding one conception and adopting another more nearly approaching the ideal in view.

The educational device which forms the subject matter of this application is an improvement, in certain particulars, upon the educational devices disclosed in my prior applications Serial Nos. 227,336 and 250,459, filed, respectively, May 21, 1951, and October 9, 1951. The former application has matured into Patent No. 2,625,750, issued to me January 20, 1953, and the latter application bears the same patent date as this application.

Other objects, advantages and features of invention will hereinafter appear.

Referring to the accompanying drawing, which illustrates a preferred embodiment of the invention, Fig. 1 is a perspective view of the device, the cover being removed so as to disclose interior structure, and a portion of one of the side walls of the trap or lower section of the box being broken away, so as more clearly to disclose the duplex character of the device. A few answer blocks are shown, which are typical of the considerable number of such blocks which may be used.

Fig. 2 is a fragmentary reproduction of the upper corner portion of Fig. 1, the slide having been moved from the answer concealing position to a position wherein the answers are observable through its windows.

Fig. 3 is a section on line 3—3 of Fig. 2, including the cover.

Fig. 4 is a cross section on line 4—4 of Fig. 1, the cover being included. Central parts are broken out to contract this view.

Fig. 5 is a dual view showing the matter inscribed on opposite faces of one of the answer blocks.

Fig. 6 is a dual view showing the matter inscribed on opposite faces of another answer block.

Fig. 7 is a fragmentary perspective view of one of the division problem slips shown partly folded.

Figs. 8 and 9 respectively show obverse and reverse face views of one of the pictorial problem slips or sheets in unfolded condition.

Figs. 10 and 11 are, respectively, obverse and reverse fragmentary face views of a non-foldable pictorial problem slip, shown slightly in perspective.

Fig. 12 is a dual perspective showing the opposite faces of a modified answer block adapted to be made of cardboard or pasteboard.

Referring in detail to the drawing, a rectangular tray 5, is provided, desirably about six inches wide, eight inches long and three-fourths of an inch deep. This tray, which constitutes a supporting means for various parts, may be made of tough pasteboard, and should be provided with a cover 6.

Twin elongated blocks 7 and 8, rectangular in cross section, extend transversely of said tray, one at each end thereof, and are internally glued or otherwise secured to its end walls and bottom.

At each side of the tray each of said blocks has a horizontal slot 9 cut endwise thereinto near the upper side of the block, each of said slots being dimensioned to have slidably fitted into it one end portion of a slide 10 made of Lucite or other non-fragile, transparent material; two of said slides being thus horizontally supported, one at each side of the tray in an upwardly spaced relation to its bottom 11, and extending internally along the side wall of the tray. Said slides each have a series of opaquely painted upper surface portions 12, and between said painted portions a longitudinally extending series of transparent portions or windows 13, and each slide may be provided near one end with an operating aperture 14 to receive the point portion of a pencil or stylus.

A pack 16, or 17 of problem slips is nested under each slide 10, the uppermost slip of each pack being close to or in engagement with the slide 10 which it underlies. In the illustrated embodiment of the invention these two packs are presumed to be made up of four page foldable arithmetical problem slips sufficient in number to cover elementary addition, subtraction, multiplication and division, typical slips 20 and 21 being shown; there also being a foldable pictorial problem slip 22 and a single ply pictorial problem slip 23, the latter having but two "pages," these being formed by its opposite faces. Each foldable slip has along its midwidth a fold line 24 along which it is foldable in reverse directions so as to bring the desired, selected pages thereof outside, so that the column of answers on the selected page may be placed in an underlying, upwardly directed relation to either slide 10. Each problem slip is slightly shorter than the distance between the aforesaid blocks 7 and 8 so as readily to be inserted between them under the slides 10.

The slip 20 may have inscribed upon it the multiplication table from two times two to five times nine, it being understood that a complementary foldable strip will be provided to carry the remainder of the multiplication table up to and including nine times nine. Also the typical slip 21 is shown having inscribed upon it a portion of the division table, and another foldable strip, complementary to said strip 21 will be provided to carry the remainder of the division table up to and including eighty-one divided by nine.

Fig. 1 discloses part of the problems that are inscribed on the slip 20, and Fig. 7 shows part of the problems which are inscribed on the slip 21, the latter view illustrating how the numerals at one side of the fold line 24 are inverted in relation to those on the opposite side thereof. This arrangement of the numerals is deemed desirable because, as a result, when the folded slips are put into their operative positions, the free edge portions of each folded slip are nested under the slide 10 causing the uppermost mounted slip to be in a flat, compact condition. All of said foldable slips may be made of a tough but foldable cardboard which may readily be printed on and which will wear for a long time. The non-foldable slip 23 should be made thicker than the foldable slips.

When either of the numerical problem slips is in its mounted position under one of the slides 10, and the tray 5 is disposed before the user with that slide at his left, such slip will have under the slide a column of answers 25 along the left hand portion of its upper, exposed face, said answers being the answers to the problems in the column 26 of problems on the part of the slip not under the slide.

Pictorial problem slips, shown in Figs. 8, 9, 10 and 11, will also be used and a set of answer blocks, desirably forty-eight in number will be used which carry numbers and words answering the various problems; but the use of the device for solving numerical problems will first be described.

At this point it should be noted that, in each column of answers 25 on the arithmetical problem strips adjacent answers are sufficiently spaced apart to allow the windows of the slide to be shifted into positions where they do not disclose any portions of underlying answers.

In Fig. 1 are shown typical answer blocks 29 in answer indicating positions and in Fig. 5 is shown a typical answer block 30 having a numerical answer 30a inscribed upon one of its faces and a word 30b answering a pictorial problem inscribed on its opposite face. Also Fig. 6 shows another typical answer block 31 having a numerical answer 31a inscribed upon one face and a word 31b answering a pictorial problem inscribed upon its opposite face. The numerical answer "81" on said block 31 will be used only in multiplication, and represents the highest product of a multiplication table ending with nine times nine.

In order to adapt the device for performing primary computations in addition, subtraction, multiplication and division, seventeen blocks must be provided bearing numerals "2" to "18" and also twenty-one blocks bearing all the required multiples from "20" to "81"; making in all thirty-eight blocks. But it is desirable to use two more blocks, one bearing "0" and one "1" making a total of at least forty blocks.

The tray 5 should be sufficiently spacious to contain all the answer blocks which will be used. Preparatory to using the device the cover 6 will be removed from the tray and placed on a desk or table open side up. Then all the blocks will preferably be removed from the tray and deposited in the cover with their numeral bearing faces directed upwardly, if arithmetical problems are to be solved. Then the slip bearing the desired arithmetical problems on one of its faces will be placed uppermost in one of the packs of problem slips with said one face directed upwardly. Then, with the slide at that side of the device so adjusted as to cover up the column of answers on said uppermost slip, the child is ready to select and put in place the answer blocks which he thinks will answer the various problems. After doing this he will shift said slide into the position wherein the answers on the slip are observable through the windows 12 of the slide and will use the uncovered answers to check up on the correctness of the answers indicated on the selected blocks.

In the lower, right hand portion of Fig. 1 the pictorial problem slip 23 (see Figs. 10 and 11) is shown on top of the pack of slips underlying the slide 10 at that side of the device, the inverted pictures on said slip representing problems to be solved by selecting and putting into place blocks bearing words which name the pictured objects. It is to be understood that, before putting the latter blocks into place the tray 5 will be turned end-to-end in relation to the user so that the pictures on the mounted slip 23 will appear in their natural positions, this procedure being necessary in case of changing from the solution of numerical to pictorial problems, and vice versa, assuming the pack of numerical problem slips is kept under one slide and the pack of picture problems kept under the other slide.

In Fig. 1 are indicated "parking" lines 35 between which the answer blocks are to be placed. However, these are not essential, at least not if the blocks are so dimensioned that, when eight of them are consecutively put into place alongside a mounted problem slip, they approximately fill in the space between the slide carrying blocks 7 and 8.

On the pictorial problem slips the pictures represent the problems and the columns of words 25a represent the answers to the problems, said answers being concealed by or else observable through the overlying slide 10, depending upon the position of the latter.

When forty or more answer blocks are used in the set from which selections are made, each block being of a comparatively thin, domino like character with a number on one of its large faces and a word on the opposite face, it facilitates selecting the blocks which answer the pictorial problems to classify the pictures and the corresponding words in some simple way; and this may be done by coloring in the same manner at least parts of the problem slip faces and block faces which pertain to the same class of objects. By way of example, this is shown in the drawing, where the block face (Fig. 5), bearing the word "apple" carries the red indication, and the problem slip faces shown in Fig. 8 also carry the red indication; this being done to classify together problem slip pages and words pertaining to the vegetable kingdom. Likewise the block face bearing the word "hen" (Fig. 6), and the problem slip pages of Fig. 9 are both shown bearing the blue indication to classify together block faces and problem slip faces pertaining to the animal kingdom. This simplifies and renders less tedious the selection of word bearing answer blocks.

Blocks of a more nearly cubical shape can be provided, if desired, and the blocks reduced in number by inscribing word and number answers on more than two faces of each block; but when this is done care must be taken to avoid having two or more of the answer numbers for any one column of problems located on one block only, because one block cannot be placed in more than one problem answering position at the same time. Also, words answering picture problems should not be improperly grouped on faces of the same block.

After words and numbers have been printed on rows of blocks in the form of wooden strips, said strips may then be dipped in a properly thinned red paint, which will give the blocks, after being sawed apart an attractive color, without materially obscuring the black words and numbers.

The attractiveness of the device may be increased by appropriately coloring the minature pictures that represent the pictorial problems.

The modified answer block 40 shown in Fig. 12 is adapted to be made of cardboard in two layers glued to each other at 41. In making blocks of this type two sheets, each as heavy as is convenient to print on, may first be printed on one face, one bearing words and the other bearing numerals. Then said sheets may be adhered to each other with their plain faces abutting and words opposite to answer indicating numbers. After this has been done the blocks 41 may be cut out from them.

The type of block shown in Fig. 12 is particularly well adapted for use when the packs 15 and 16 under the slides 10 are not very thick, and the exposed faces of the mounted problem carrying slips are only at a little higher level than the floor of the tray. In order to effect this the slots 7 in the slide supporting blocks 8 and 9 may be lowered so as to bring the slides substantially into contact with the uppermost slips of the underlying packs.

I claim:

1. In an educational device of the kind described, a tray having a floor and side walls upstanding from said floor, a pair of elongated crosspieces mounted, one at one end of said tray and the other at the opposite end thereof, each of said crosspieces substantially bridging the space between said side walls and each having a substantially horizontal slot extending into an end thereof adjacent to a side wall of the tray, a slide extending along the inner side of said side wall, said slide having its end portions loosely fitted in the aforesaid slots and being thus supported in an upwardly spaced relation to the tray's floor, a plurality of slips which are nestable in pack formation partly under said slide, each of said slips having a face along one side portion of which extends a column of problems and along the opposite side portion of which extends a column of answers to said problems, said column of answers on the upper face of the uppermost of the mounted slips underlying the slide and the remainder of said face of such slip being clear of the slide, said slide, along its length, having a series of windows alternating with opaque portions and being adjustable longitudinally so as to bring said windows into and out of register with the answers of the underlying column of answers, and a set of detached answer blocks supportable by the floor of said tray alongside the problems of each uppermost mounted slip to indicate the answers to the problems thereon.

2. In an educational device of the kind described, a tray having a floor and side walls upstanding from said floor, a pair of elongated crosspieces mounted one at one end of said tray and the other at the opposite end thereof, each of said crosspieces substantially bridging the space between said side walls and each having a substantially horizontal slot extending into each of its ends, a slide extending along the inner side of each of said side walls and having its end portions loosely fitted in the aforesaid slots at its side of the tray and being thus supported in an upwardly spaced relation to the tray's aforesaid floor, a plurality of slips which are mountable in pack formation partly under each of said slides, each of said slips having a face along one side portion of which extends a column of problems and along the opposite side portion of which extends a column of answers to said problems, said column of answers on the upper face of the uppermost of the mounted slips directly underlying the slide at its side of the tray and the remainder of said face portion of such slip being clear of the slide, said slide having along its length a series of windows alternating with opaque portions and being adjustable so as to bring said windows into and out of register with the answers of the underlying column of answers, and a set of detached answer blocks singly positionable alongside the problems of each uppermost mounted slip where said blocks indicate the answers to its problems.

3. In an educational device of the kind described, a tray having a floor and a side wall upstanding from said floor, a slide extending along the inner side of said wall, supporting means for said slide underlying its end portions and supporting it in an upwardly spaced relation to said tray floor, a problem carrying member mountable in said tray in an underlying relation to said slide, said member having an upwardly directed face upon which is inscribed a column of problems and alongside thereof a column of answers to said problems, said column of answers being under said slide when said problem carrying member is in its mounted position, said slide, along its length, having a series of windows alternating with opaque portions and being adjustable longitudinally so as to bring said windows into and out of register with the answers in the underlying column of answers on said problem carrying member.

4. The structure set forth in claim 3, and a plurality of answer blocks from which individual blocks may be selected and placed upon the floor of said tray in positions where they indicate the answers to the problems on the mounted problem carrying member.

5. In an educational device of the kind described, supporting means comprising a floor, a pair of horizontally spaced apart, horizontally slotted supports carried by said means above said floor, a slide bridging the space between said supports of said pair and having end portions occupying their slots, said slide thus being supported in a parallel superjacent relation to said floor, a problem carrying slip mountable on said floor in an underlying relation to said slide, said slip when so mounted having an upwardly directed face upon which is inscribed a column of problems and alongside thereof a column of answers to said problems, said column of answers on the mounted slip being under said slide, said slide having along its length a series of windows alternating with opaque portions and being adjustable longitudinally so as to bring said windows into and out of register with the answers in the underlying column of answers on said problem carrying slip, and a plurality of answer blocks from which blocks may be selected and placed upon said supporting means in positions wherein they indicate the answers to the problems on the mounted problem carrying slip.

ALBERT H. MERRILL.

References Cited in the file of this patent

UNITED STATES PATENTS

| Number | Name | Date |
|---|---|---|
| 163,912 | Birmeli | June 1, 1875 |
| 1,257,655 | Walden | Feb. 26, 1918 |
| 1,629,635 | Parsons | May 24, 1927 |
| 1,656,030 | Waring | Jan. 10, 1928 |
| 1,696,988 | Troidl | Jan. 1, 1929 |
| 2,581,595 | Mioduski et al. | Jan. 8, 1952 |